United States Patent Office 3,740,440
Patented June 19, 1973

3,740,440
METHOD OF INHIBITING APPETITE FOR FOOD
Zalmon Pober, Beaver Brook Apts., 154 2nd St., Apt. 311,
Framingham, Mass. 01701
No Drawing. Filed June 22, 1970, Ser. No. 48,441
Int. Cl. A61K 27/00
U.S. Cl. 424—320  3 Claims

ABSTRACT OF THE DISCLOSURE

A process for regulating the appetite of animals for foodstuffs comprising administering, to the gastrointestinal tract of the animals, an effective quantity of a local anesthetic which is substantially non-absorbable into other portions of the body. One such agent is that known as oxethazine, most conveniently ingested as one of the physiologically-tolerable salts thereof.

BACKGROUND OF THE INVENTION

Overeating is a common problem in both man and in other animals kept in special environments. The need for a safe and effective means to achieve diet control is manifested by a large number of diet-control products presently being advertised for use by man. Less evident, but nevertheless real, is the desirability of controlling the diet of experimental animals, animals kept for exhibition or agricultural purposes, and the like. While it would be possible in some circumstances to exercise an absolute control over such animals by limiting the availability of food to them, in many other circumstances (for example, where the animals are loose on a range or where the effect of other variables on the diet of the animal is being studied) an absolute diet control technique is either impossible or impractical.

It has been established, or at least hypothesized, that the gastric antrum and intestine regulate several bodily functions. For example, the response of the gastrointestinal tract to fat in the intestine is different from its response to carbohydrates or proteins. Also, within a given food category, say, fats, there is a greater inhibition of gastric activity by some fats than by some other fats.

An investigation undertaken by the present inventor was based on this earlier-developed information and was basically intended to determine the role of the intestinal mucosal receptors in the regulation of food intake. The invention arising out of the work is summarized below.

Before proceeding with the summary further, and heretofore unrelated, prior art is set forth with respect to a class of fatty-acid amide derivatives of the type described in U.S. Pat. 2,780,646 and especially that material known as oxethazaine hydrochloride (called, in the art, 2-di-(N-methyl-N-phenyl-tertbutylcarbamoylmethyl) aminoethanol and called the hydrochloric acid salt of N,N-bis-(N-methyl-N-omega phenyl tert, butyl-acetamid)-beta hydroxyethylamine according to the terminology of the aforesaid patent.

This compound is known to have a good local anesthetic action and has been widely used in the treatment of stomach ulcers and other disorders. Its safety and efficacy over prolonged periods of time, in humans as well as various animals, has been established beyond question. For example, by December 1969, one supplier of oxethazaine hydrochloride had compiled a bibliography of fifty-two papers appearing in various medical journals (or presented at medical symposia) reporting on the efficacy and safety of the drug. For example, a paper by E. Deutsch and H. J. Christian appeared in the Journal of the American Medical Association, vol. 169, pp. 2012–15 (1969) reporting successful use of the drug in stomach-pain cases for periods extending up to 18 months.

Thus the safe use of this drug in humans, as well as in animals, is already established. Moreover, according to the Physicians' Desk Reference (Medical Economics, Inc., 1969) the drug permits ulcer patients to have a pronounced increase in the volume of food intake and to have a greater variety of food in the diet. The material is commercially available in a number of forms including that sold under the trade designation Oxaine suspension by Wyeth Laboratories, a division of American Home Products Corporation.

It should also be pointed out that earlier investigators had been led to believe that oxethazaine inhibited acid secretions, but it has not been established if and/or how the quantity of such secretions relate to the phenomenon of hunger in animals.

SUMMARY OF THE INVENTION

It is an object of this invention to provide a process for controlling appetite of animals.

It is another object of the invention to provide such a process which does not unduly interfere with the quantity of liquids imbibed by an animal on whom the process is being utilized.

A further object of the invention is to provide a highly selective process which controls the appetite of animals without any other undesirable side effects on the physiology thereof.

Another object of the invention is to provide a safe, self-regulating food.

Still another object of the invention is to provide means to protect animals from overeating toxic weeds.

Another object of the invention is to provide means to prevent animals from stripping land bare of erosion-preventing foliage during times of drought.

Other objects of the invention will be obvious to those skilled in the art on reading the instant invention.

The above objects have been substantially achieved by utilizing means based on the discovery that local anesthetic agents, e.g., oxethazaine and the physiologically-tolerable salts thereof, when administered in effective quantities to the gastrointestinal tract interface with the neural action of the mucosal receptors therein to such an extent that the appetite is diminished. The effect of such agents is manifested by typical dosage-response curves; therefore, the quantitative effect on the appetite can be pre-determined by size of the dosage applied to the animals. Such anesthetic agents are readily administered in any of a number of forms including pills, tonics, and the like. However, there are several means of administering the drug which have special utility. For example, the drug can be added to foods, either generally or selectively, to provide a self-regulating diet food.

In veterinary uses, the active agent can be sprayed on grazing land, or selected portions thereof, e.g. at times when toxic weeds are present to limit the intake of such weeds. Moreover, the appetite of crop-raiding animals such as squirrels, chipmunks, groundhogs and the like can be minimized by applying the active agent to baits or even directly to the crops which are subject to the raiding.

It is pointed out that special packaging techniques are often required in ruminants to assure that the drug reaches the desired situs in the animals gastro-intestinal tract. Thus, for example, time-release techniques, known to the pharmaceutical industry, for packaging drugs are suggested for use in such applications.

It is believed that the action of such drugs may be enhanced by an anti-cholinergic activity thereof, i.e. a property whereby the drug interferes with the normal functions performed in transmitting or modifying neural impulses. Indeed, applicant believes that, where anesthetic properties are not required, physiologically tolerable anti-cholinergic materials characterized by their ability to resist absorption from the gastro-intestinal tract are generally useful in diet-control applications.

Thus, in summarizing the essential characteristics of the active materials which are found useful in the process of the invention are that they be (1) Non-absorbable into the animal being treated, from the gastro-intestinal tract except in physiologically-negligible quantities.

(2) Active in modifying the chemical environment of the mucosa of the gastro-intestinal tract to inhibit the neural action thereof and consequent gastric activity therein.

Among the qualifying compounds, qualified by the above standards for use in the invention, are (1) local anesthetic materials and (2) anti-cholinergic agents. Particularly desirable materials readily qualified for use in humans are the materials oxethazaine and the physiologically-tolerable salts thereof which exhibit both of the aforementioned local anesthetic and anti-cholinergic properties.

ILLUSTRATIVE EXAMPLES OF THE INVENTION

In order to point out more fully the nature of the present invention, the following working examples are given as illustrative embodiments of the present process and products produced thereby.

All experimental information described below was obtained on male Sprague-Dawley derived rats housed in individual cages. The animals were fed a standard diet of cereal-type feed sold under the trade description "Lab-Chow" and sold by Ralston-Purina Company. Free access to water was permitted during all the tests.

The animals were divided randomly into two groups, one of which was a control group and the other of which received 0.5%, based on the weight of food intake, of oxethazaine HCl. The food and water intake of each group of rats was determined periodically during a six-day period. The results are shown in Table I below.

TABLE I

| Day | Average food intake per animal (grams) | |
|---|---|---|
| | Control group | Treated group |
| 1 | 14.2 | 9.8 |
| 2 | 13.5 | 9.3 |
| 3 | 13.2 | 9.0 |
| 4 | 11.0 | 9.0 |
| 5 | 11.9 | 9.2 |
| 6 | 15.5 | 8.2 |

| Average water intake (milliliters per week per animal) | |
|---|---|
| Control group | Treated group |
| 114.8 (SE=2.6) | 96.1 (SE=4.0) |

Table I clearly demonstrates that the food intake of the control group was about 45% in excess of the food intake of the treated rats. Yet the total decrease in the water content was moderate and indicated no independent inhibition of normal liquid-intake habits. The drop in water content is attributable to the normal decrease in water requirement resulting directly from the decrease in food intake.

In order to establish the fact that the appetite inhibition was caused by an effect on the gastrointestinal area, the drug was administered intragastrically by intubation to sixteen randomly-selected rats using sixteen other randomly-selected rats as controls. Food and water intake were measured during a twenty-four hour period: a nine hour test period followed by a fifteen-hour recovery period. Spilled food was accoounted for and water loss was minimized by use of special watering tubes containing ball bearings. The tests were conucted in thermostatically controlled rooms which were kept lighted in an attempt (apparently unsuccessful) to eliminate diurnal variation in feeding. The control rats in this intubation procedure were given a quantity of water by intubation which was volumetricaliy equivalent to a 5 milligram dosage of oxethazaine hydrochloride administered to the rats treated by the intubation procedure.

The oxethazaine hydrochloride was then administered to one groups of rats at one of a series of intubations carried out at 7, 9, 11, 1 and 3 o'clock during the second day and to another group of rats on the fourth test day only. Results of this procedure are shown below.

| Test day | Food intake (grams per hour per animal) | | | |
|---|---|---|---|---|
| | Group A | | Group B | |
| | Day [1] | Night [2] | Day [1] | Night [2] |
| 1 | 0.5 | 0.7 | 0.43 | 0.7 |
| 2 | 0.16 | 0.65 | 0.5 | 0.65 |
| 3 | 0.5 | 0.69 | 0.63 | 0.63 |
| 4 | 0.5 | 0.69 | 0.3 | 0.55 |

[1] The 9-hour test day.
[2] The 15-hour recovery period.

The two administrations of oxethazaine hydrochloride by intubation, i.e., those to the Group B rats on the fourth day and to the Group A rats on the second day show clear evidence of the drug having limited the quantity of food intake of each group.

Continuing experimentation by intragastric intubation techniques, a dose response curve was prepared which can be characterized by the following data.

| Food intake (percent of control): | Daily dose of oxethazaine HCl (mg./100 gms. body wt.) |
|---|---|
| 90 | 0.5 |
| 75 | 1 |
| 55 | 2 |
| 43 | 3 |
| 30 | 4 |
| 20 | 5 |
| 14 | 6 |
| 9 | 7 |
| 6 | 8 |
| 5 | 9 |
| 4 | 10 |

It is also to be understood that the following claims are intended to cover all of the generic and specific features of the invention herein described, and all statements of the scope of the invention which might be said to fall therebetween.

What is claimed is:

1. A process for reducing food intake of men or animal subject requiring food intake control, said process comprising selectively modifying the chemical environment of the mucosa of the gastrointestinal tract of said subjects to cause the inhibition of gastric activity therein by administering, to gastrointestinal tract an effective quantity of oxethazaine or a physiologically-tolerable salt form thereof, thereby limiting the food intake of said men or other animals.

2. A process for selectively limiting the feeding of an animal on crops, toxic plants or other such plants the ingestion of which is to be discouraged comprising the steps of spraying an effective amount of oxethazine or a physiologically-tolerable salt form thereof on said plants.

3. An appetite control composition comprising a foodstuff and a predetermined amount of oxethazine or a physiologically-tolerable salt thereof, said predetermined amount being effective to achieve an appetite regulating effect on one ingesting said food.

References Cited

Rheault et al.: Chem. Abst., vol. 62 (1965), p. 11015e.
Heully et al.: Chem. Abst., vol. 62 (1965), p. 11016a.

SAM ROSEN, Primary Examiner